Nov. 14, 1944. C. S. ROBINSON 2,362,773
AERIAL CAMERA MOUNT
Filed March 23, 1942 3 Sheets-Sheet 1

INVENTOR
Cecil S. Robinson
BY
ATTORNEY

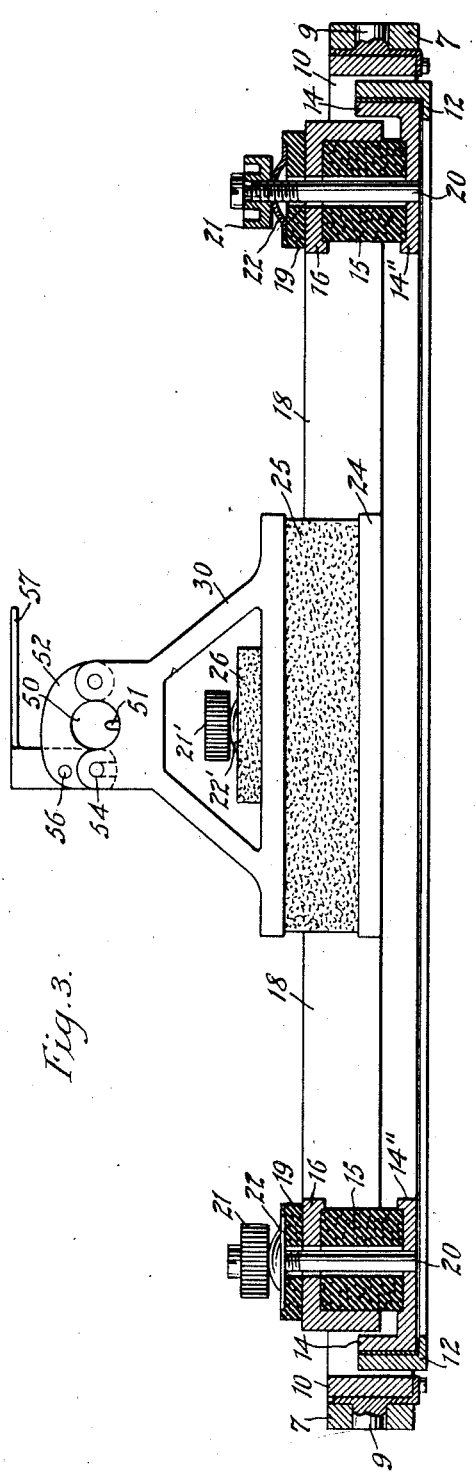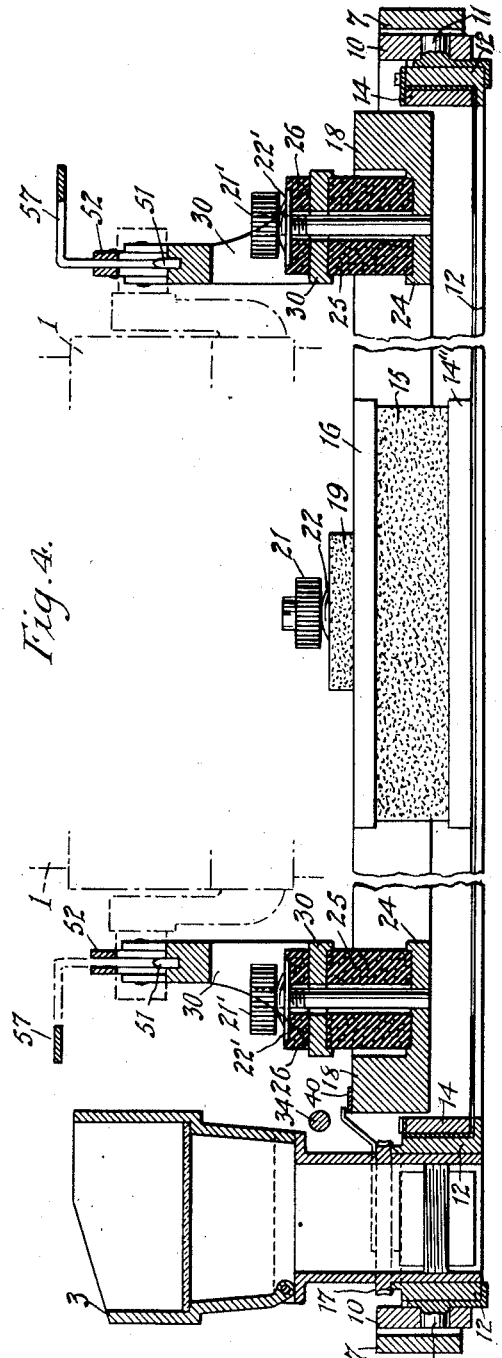

Nov. 14, 1944.   C. S. ROBINSON   2,362,773
AERIAL CAMERA MOUNT
Filed March 23, 1942   3 Sheets-Sheet 3
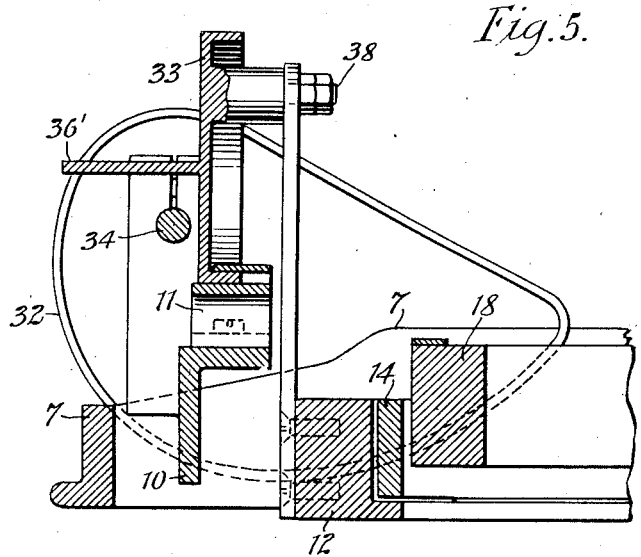
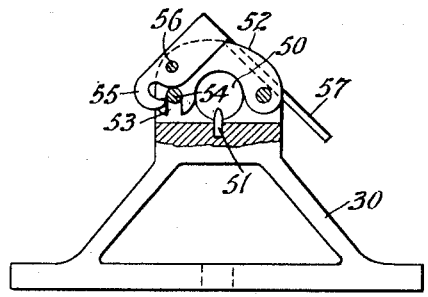
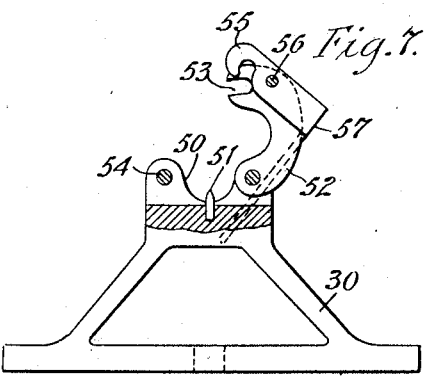
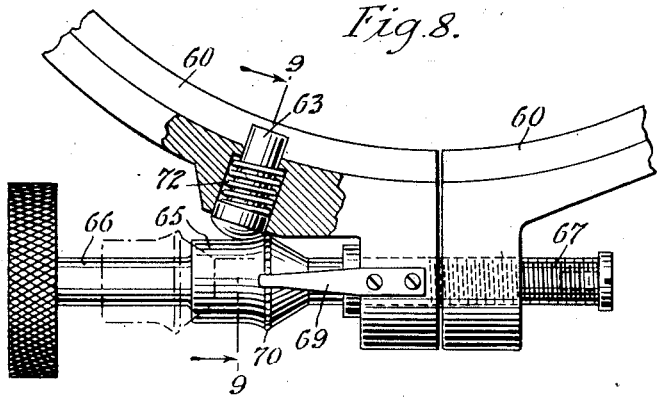
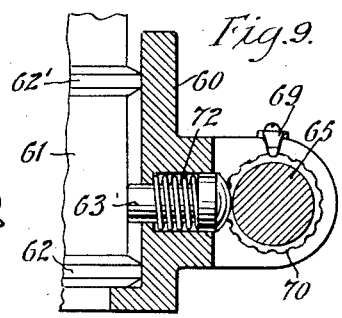
INVENTOR
Cecil S. Robinson
BY
ATTORNEY Patented Nov. 14, 1944

2,362,773

UNITED STATES PATENT OFFICE 2,362,773

AERIAL CAMERA MOUNT

Cecil S. Robinson, Ithaca, N. Y., assignor of one-half to Dorothy H. Robinson, Ithaca, N. Y.

Application March 23, 1942, Serial No. 435,801

5 Claims. (Cl. 33—64)

This invention relates to the mounting of apparatus on airplanes so as to be readily levelled and free from vibration. It is particularly applicable to the mounting of cameras, bomb-sights, and other delicate and precise apparatus. An airplane is seldom exactly level in flight, is subject to varying degrees of vibration, and, due to cross-winds, usually flies over the ground in some direction other than that in which it is pointed. This diagonal or sideways motion is known as crab. It is customary to mount aerial cameras in gimbal rings whose axes are longitudinal and transverse to the airplane; and when crab is not present, the camera may be readily leveled by observing the longitudinal and transverse displacement of the leveling bubble and tilting the camera about the transverse axis to eliminate the longitudinal deflection and tilting it about the longitudinal axis to eliminate the lateral deflection. Two simple and direct motions thus bring the bubble to the level position.

But when there is a cross-wind the camera or bomb-sight must be turned to correspond to the angle of crab, in order that it follows the actual direction of flight. The longitudinal and transverse axes of the gimbal mount are then different from the longitudinal and transverse axes of the airplane. While the apparatus can still be leveled, the motions required become somewhat more complicated.

The angle of incidence that the longitudinal axis of an airplane makes with the horizontal varies with the loading and other conditions, and airplanes also are sometimes so loaded as to fly with one wing higher than the other. When such conditions are fairly constant during a flight it is desirable to give the camera or bomb-sight mount a more or less fixed setting in the opposite direction, so that the ordinary leveling then merely has to handle the transient disturbances.

With prior mounts of the ordinary type, the cross-leveling, when crabbed, was not at right angles to the so-called fixed setting fore and aft; so that when the cross-level was changed the fore-and-aft leveling was also affected. A series of adjustments was then required. In order to clearly separate the steady from the transient factors, and to permit the mount to be initially leveled in two simple movements regardless of whether the airplane is crabbed or not, the present invention provides primary leveling axes which always remain at right angles and coincident with the principal axes of the airplane, regardless of crab. These carry a supplementary gimbal ring which is thus substantially level for all normally constant conditions; and on this level basis is mounted the crabbing ring which carries the secondary gimbals, preferably with elastic pivots, by which the continuous leveling for transient conditions is accomplished. This combination of four sets of pivots or gimbals avoids the confusion of axes heretofore present; and it has been found to make the operation much easier under crabbing conditions, or when one wing is flying consistently lower than the other.

Another object of the present invention is to provide an improved view finder which will not shift from the operator's normal field of vision when the mount is crabbed. Originally in aerial photography the view finders were separate from the camera, and had to be manually adjusted after taking a reading from the crabbing ring. Then came the forms in which the finder was attached directly to the camera or its supporting ring, in which case the finder traveled to the right or left as the camera turned or crabbed, thus moving away from the normal field of vision of the cameraman. In the present invention the view finder turns to keep parallel with the direction of the camera, but does not shift bodily sideways, so that the cameraman does not have to shift his eye.

A further object of the invention is to improve the elastic pivots so as to better insulate the upper plates from vibration, and also to compensate for any variations in the size of the molded unit and for any permanent set that may occur over a period of time. Another object of the invention is to improve the smoothness of operation by controlling the friction of the crabbing ring. A further object is to improve the trunnion clamps so that they can be operated quickly and in a single motion, even though the operator has on heavy gloves; and various other objects relating to the convenience and efficiency of the apparatus will become apparent as the description proceeds.

Referring now to the drawings forming part of this specification,

Fig. 3 is a cross-section on the line 3—3 of Fig. 1.

Fig. 4 is a cross-section on the line 4—4 of Fig. 1.

Fig. 5 is a detail cross-section on the line 5—5 of Fig. 1.

Fig. 6 is a view of the trunnion clamp nearly closed.

Fig. 7 is a view of the trunnion clamp open.

Fig. 8 is a detail view of a safety locking device for retaining the camera when clamped at the neck.

Fig. 9 is a cross-section on the line 9—9 of Fig. 8.

Similar reference numerals refer to similar parts thruout the various views.

Figure 1:
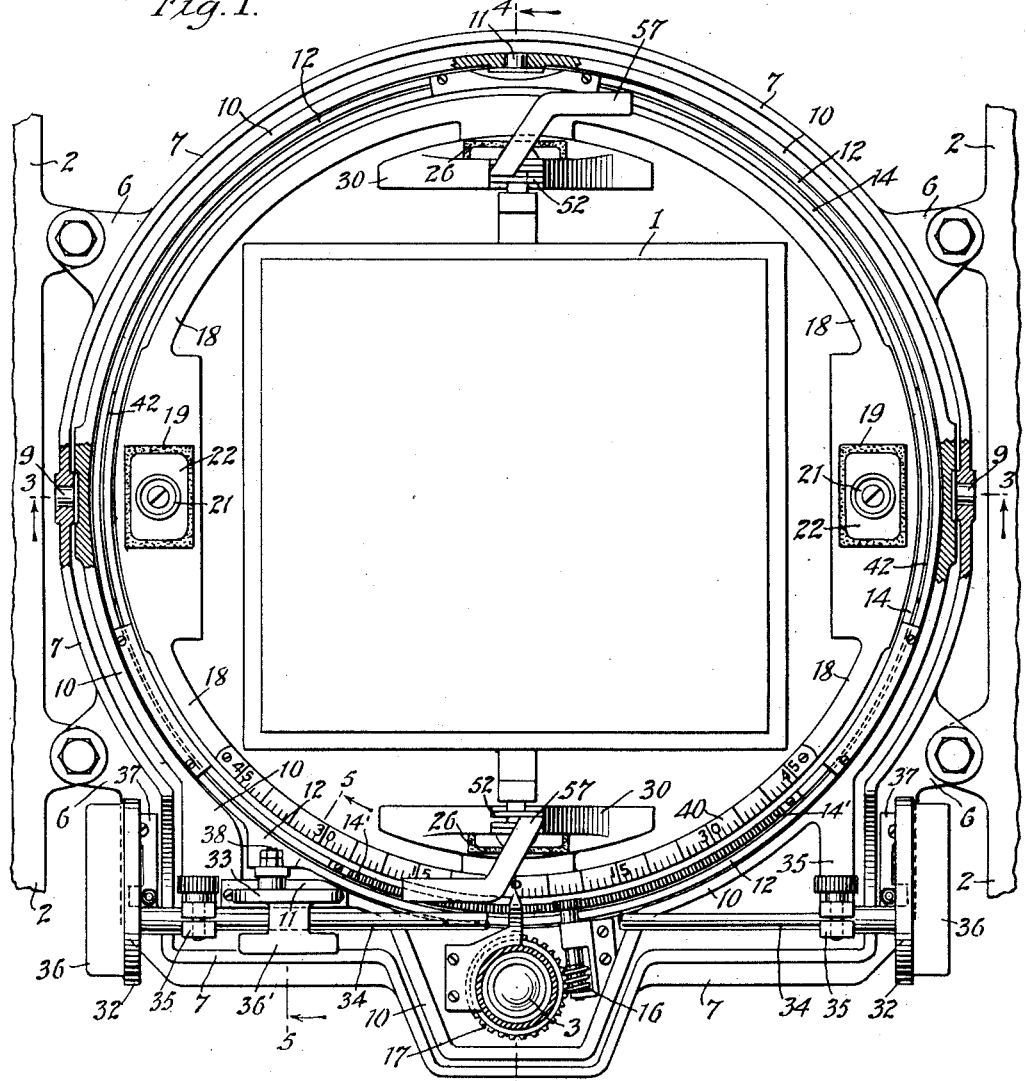
Fig. 1 is a plan view, partly in section, of the improved mount.

Referring now to Fig. 1, the camera, bombsight, or other object to be oriented and leveled is shown conventionally and indicated by the reference numeral 1, while the floor of the airplane or other structure on which it is mounted is indicated by the reference numeral 2—there generally being an opening in such a floor thru which the camera or other apparatus (hereinafter referred to as the camera) may be sighted. The view finder is indicated by the reference numeral 3.

The mount by which the camera and finder are leveled, oriented and protected from vibration, is secured to the floor 2 by the feet 6 which support the outer ring or main frame 7. This frame 7 extends around the various movable inner rings and parts but does not touch them except at pivots and cams to be described. Assuming that the top of Fig. 1 is in the direction of the nose of the airplane, the pivots 9—9 at the sides of the frame 7 may be termed the transverse pivots, and these carry the first leveling or gimbal ring 10. When the longitudinal axis of the airplane is tilted up or down at various angles to the horizontal, it will be obvious that the ring 10 can be leveled to neutralize such movements by merely turning in the pivots 9 relative to the frame 7.

To level the instrument when the airplane tilts transversely, as when flying with one wing higher than the other, a pair of longitudinal pivots 11—11 are provided in the gimbal ring 10, at right angles to the pivots 9—9; and on these pivots 11—11 is mounted the second leveling or gimbal ring 12, which, by the combination of movements about the two sets of pivots 9—9 and 11—11 described, is capable of being maintained in a horizontal plane regardless of tilting of the airplane in any direction. These two gimbal rings 10 and 12 are in general not especially concerned with momentary oscillations in the present invention, but are utilized to neutralize more or less permanent off-level conditions, such as the longitudinal angle of incidence required in the particular flight, or unbalanced wing conditions, due to loading. The momentary or transitory leveling is done on a secondary pair of gimbals having resilient pivots, to be described later.

The gimbal ring 12 carries nested within it a rotatable ring 14, as shown in Fig. 1 and more particularly in Fig. 3 and Fig. 4. This ring 14 is known as the crabbing ring, since it can be rotated by sliding in the groove of the gimbal ring 12 so as to rotate the whole camera assembly to whatever is the true direction of flight when the airplane is encountering cross-winds. On this crabbing ring 14 is secured a rack 14', whose teeth, thru a suitable meshing pinion, drive the worm 16 and worm wheel 17, which turns the view finder 3 the same angular amount that the camera 1 has turned, so that their lines of sight remain parallel.

The crabbing ring 14, at transverse points approximately opposite the pivots 9, has flanges 14", as shown best in cross-section in Fig. 3, which support the resilient pivot cushions 15—15. These cushions are preferably made of sponge rubber or similar elastic material. On the top of these cushions 15—15 rest the flanges 16—16 which are part of the innermost gimbal ring 18. On top of each flange 16 is placed a supplementary resilient cushion 19. The cushions 15, 19 and the flange 16 all have a vertical hole thru them considerably larger in diameter than the steadying bolt 20, which is fixed to the flange 14" and extends up thru the cushions 15, 19 and the flange 16 without touching them, so that no vibrations can be communicated directly to them by the bolts 20. An adjusting nut 21 on the top of each bolt 20 permits any desired degree of initial compression to be placed on the cushions 19 and 15, the nut 21 pressing on a plate 22 (see Fig. 1), which extends substantially over each cushion 19 but has no contact with the gimbal ring 18. The adjusting nuts 21 permit compensation for any variation in size of the molded rubber cushions 19 and 15, and also for any permanent set the rubber may take over a period of time. The elastic pivots have a quality of smooth responsive resilience which is not subject to the transition from static to moving friction characteristic of ordinary mechanical pivots, and it has been found that this contributes to clear photography.

The innermost gimbal ring 18 is provided with lower flanges 24 substantially at right angles to the flanges 16, and on these flanges 24 rest resilient cushions 25—25, thus providing another pair of elastic pivots at right angles to the elastic pivots 15—15 above described. These are best shown in Fig. 3 and Fig. 4, and are provided with supplementary cushions 26—26, similar to the supplementary cushions 19—19 previously mentioned, and have similar adjusting nuts 21' and plates 22'. Only the upper or supplementary cushions 19—19 and 26—26 are visible in Fig. 1, as flanges conceal the main cushions 15—15 and 25—25; but it will be understood that the elastic pivot cushions 15—15 normally lie substantially on the line 3—3, and the pivot cushions 25—25 lie substantially on the line 4—4 in Fig. 1, when there is no crabbing. Fig. 3 and Fig. 4 are views at right angles to each other.

The base plates of the trunnion brackets 30 which directly support the camera 1 or other instrument rest upon the resilient cushions 25—25. The camera trunnions are securely clamped in the brackets 30 by means which will be described, so that the camera can be leveled by tilting it on the two sets of resilient cushions acting as gimbal pivots. These elastic cushions 15—15 and 25—25, as well as their supplementary cushions 19—19 and 26—26 also serve to absorb vibrations which may have passed the primary gimbals. The long path that vibrations must follow, including two sets of resilient pivots at right angles to each other, an intermediate ring, and two more gimbals with their pivots, largely absorb vibration before it reaches the camera.

From the foregoing it will be seen that the camera or other apparatus is suspended on two pairs of elastic gimbal pivots which in turn are carried on two outer gimbals, the inner two sets of elastic pivots being capable of various degrees of orientation in azimuth relative to the outer gimbals.

Figure 2:
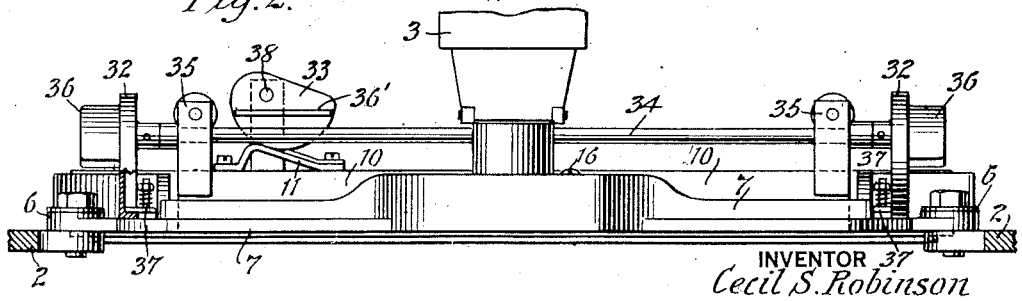
Fig. 2 is an elevation of the front portion of the mount.

The inner pair of gimbals with the resilient pivots are leveled by the hand of the operator on the camera, and when released by his hand they return to the central position by virtue of the inherent elasticity of those pivots. The two outer gimbals however, on which it is desired to maintain more permanent settings, are leveled by the operator using mechanical means which will hold the settings given. In order to give quick action in a single motion, friction controlled cams 32 and 33 are provided, as shown in Fig. 1, Fig. 2 and Fig. 5.

The cams 32 control the setting of the gimbal 10 for longitudinal leveling, and are mounted on a cross-shaft 34 which is attached to the gimbal 10 by means of the brackets 35. The cams 32 are provided with hand grips 36 by which they can be rotated, and the faces of the cams bear on the stationary main frame 7. Spring pressed friction brake shoes 37 (best seen at the left in Fig. 2), assist in holding the cams wherever set. When the cams 32 are turned they lift the shaft 34 and the gimbal 10 with them (as the frame 7 is fixed), and the gimbal 10 can thus be quickly set to compensate for any continued deviation from horizontal of the longitudinal axis of the airplane.

A similar cam 33 is placed to operate at right angles, its shaft 38 being attached to the gimbal 12 which oscillates transversely on the pivots 11—11. The face of the cam 33 bears on a portion of the gimbals ring 10, so that movement of the cam 33 forces the gimbal 12 to tilt transversely, since the gimbal 10 is so pivoted that it cannot itself react transversely. To level the gimbal 12 transversely the operator turns the handle 36' in the appropriate direction, and thus quickly compensates for a condition where one wing of the airplane is flying lower than the other, due to loading or other more or less continuous condition. The use of cams for leveling, instead of the screws previously employed, gives a much quicker action with a simple single motion of the hand, and produces a smooth leveling action which is self-locking.

These preliminary settings having been made, it will be seen that the gimbal 12, which contains the crabbing ring 14, is substantially level relative to both the longitudinal and transverse axes of the airplane. If now the camera or other apparatus is crabbed to some amount as shown on the scale 40, the problem of keeping it level during the usual transitory inclinations is much simplified. The operator merely returns the camera directly according to the deviations indicated by the shift of the usual leveling bubble (which is turned to stay parallel with the crabbed position of the camera 1), and he is not confused by the fact that the outer gimbal pivots are not parallel to his new axes, since both of his inner gimbal pivots are so parallel, and these are the ones he is then using.

In order that the mount be not restricted to any particular form of camera, bomb-sight or other apparatus, trunnion bearings are provided in the brackets 30 of the inner frame 18. It has been found that ordinary screw fastenings are slow to operate and liable to shake loose, and so an improved clamp is provided as shown particularly in Fig. 6 and Fig. 7. The trunnion socket 50, provided with the dowel pin 51 for which the trunnion of the camera is drilled, is fitted with a pivoted bearing cap 52 having a slot 53 at its free end. This slot 53 drops over the pin 54 when the cap 52 is down, and is then held securely by the hook 55, which is pivoted to the cap 52 at the point 56, and operated by the handle 57. In the completely locked position the handle 57 is pulled up to a horizontal position as shown in Fig. 1.

It will be seen from Fig. 6 that when the handle 57 is horizontal the hook 55 will be around the pin 54; and since the pivot 56 is located above the pin 54, any strain upon the cap 52 will only lock it tighter. The tip of the hook 55 is formed with a slight high spot so that after it is forced past the pin 54 it will not readily disengage. It will be understood that with fighting airplanes, exposed to all sorts of maneuvers, a tight lock is essential. The locking means described is less likely to work loose under continuous vibration than a screw fastening of the ordinary type.

Some types of cameras and other apparatus, instead of being provided with trunnions, are held by clamped rings around their nose or barrel. It is of course equally important in that case that the fastening be very secure, since a loose camera or bomb-sight might wreck its airplane in a violent maneuver. A safety nose clamp in shown in Fig. 8 and Fig. 9, in which the reference numeral 60 indicates a split clamping ring adapted to fit over the nose 61 of the camera or other apparatus (see Fig. 9), which is provided with a groove between the flanges 62 and 62'. A safety locking pin extends into the groove so that the neck cannot be withdrawn without the pin 63 meeting the flange 62. The locking pin 63 cannot be withdrawn unless the clamping ring 60 is unscrewed, for the reason that an enlarged portion 65 of the screw shaft 66 bears against the head of the locking pin 63 when the ring 60 is tightened. The screw shaft 66 has a screw thread 67 by which the nose clamp 60 can be tightened when the knurled head 68 is turned; and a flat detent 69 engaging notches 70 in the rim of the enlargement 65 prevents the screw 66 from working loose under vibration. When the screw 67 is unscrewed sufficiently to release the camera, the enlargement 65 is then in the position indicated by broken lines 65', and the safety pin 63, expelled by the spring 72, then rests on the narrower part of the shaft 66. The pin 63 is then out of the way of the collar 62 and the nose 61 of the camera or other apparatus can then be withdrawn. The safety lock 63 operates automatically whenever the clamp ring 60 is tightened on the nose of the suspended apparatus.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art, without departing from the scope of the invention as stated in the following claims.

1. In a mount for tiltable apparatus in an airplane, the combination of a frame fixed relative to the airplane, a tiltable frame movable about an axis transverse to the airplane, cam means comprising a cam and follower operating between the fixed frame and the tiltable frame for tilting said frame, a second frame tiltably mounted on the first tiltable frame on an axis longitudinal to the airplane, a second cam means comprising a cam and follower operating between the first and second tiltable frames for moving the second relative to the first, a frame rotatable in azimuth mounted on the second tiltable frame, a pair of resilient pivotal cushions on said azimuth frame, a fourth frame mounted on said resilient cushions, a second pair of resilient pivotal cushions carried on said fourth frame and having their axis transverse to that of the first mentioned resilient cushions, the second pair of resilient cushions forming the base to which the tiltable apparatus may be secured, whereby such apparatus carried on the second pair of resilient cushions may have its resilient axes parallel and transverse to the direction of flight of the airplane relative to the ground when flying in cross-winds, while the axes of the first mentioned two tiltable frames remain parallel to the longitudinal and transverse axes of the airplane.

2. In a mount for optical apparatus in an airplane, the combination of a pair of gimbals having their axes parallel to the longitudinal and transverse axes of the airplane for primary leveling relative thereto, a secondary gimbal carrying the apparatus, the secondary gimbal being rotatably mounted on the inner one of the first mentioned gimbals for rotation in azimuth relative thereto, so that the axes of said secondary gimbal may be set parallel and transverse to the direction of flight of the airplane relative to the ground when flying in cross-winds, a view finder mounted on the one of the first mentioned pair of gimbals having the primary level, and a parallel motion mechanism connecting the view finder to the secondary gimbal, whereby the view finder is rotated in azimuth to the same degree as the secondary gimbal.

3. In a gimbal mount, the combination of a pair of gimbals having their axes transverse to each other, a secondary gimbal having axes transverse to each other, said secondary gimbal being carried by the inner one of the first pair of gimbals and mounted to be rotatable in azimuth relative thereto, gearing operated by said relative rotation in azimuth, and a view finder mounted on the inner one of said first pair of gimbals and having an optical axis perpendicular to the plane of that inner gimbal, said view finder being rotatable in azimuth about said optical axis by said gearing to the same degree as the secondary gimbal.

4. In a gimbal mount, the combination of a pair of gimbals having their axes transverse to each other, a secondary gimbal having resilient axes transverse to each other, said secondary gimbal being carried by the inner one of the first pair of gimbals and mounted to be rotatable in azimuth relative thereto, gearing operated by said relative rotation in azimuth, and a view finder mounted on the inner one of said first pair of gimbals and having an optical axis perpendicular to the plane of that inner gimbal, said view finder being rotatable in azimuth about said optical axis by said gearing to the same degree as the secondary gimbal.

5. In a resilient pivot for gimbal mounts, the combination of a gimbal having a pivot support, a main resilient cushion on said support mounted to act as a gimbal pivot, a second gimbal having a supporting face carried on said main cushion, a supplementary resilient cushion, said supporting face being located between the main cushion and the supplementary cushion, and an adjustable pressure plate on said supplementary cushion.

CECIL S. ROBINSON.